United States Patent Office 2,903,352
Patented Sept. 8, 1959

2,903,352
BRAZING ALLOYS

Nikolajs Bredzs, Chicago, Ill., assignor, by mesne assignments, to Lithium Corporation of America, Inc., Minneapolis, Minn., a corporation of Minnesota No Drawing. Application March 20, 1956
Serial No. 572,627

3 Claims. (Cl. 75—172)

My invention relates to improvements in the brazing of metals and is especially concerned with the production of new and useful self-fluxing, air-proof brazing alloys and to the use of such alloys in the brazing of metals, particularly steels.

In the brazing of metals, it is essential, for effective results, that the brazing metal, which, at the temperature at which the brazing operation is conducted, commonly in the range of about 700 to 1000 degrees C., is in a liquid or molten state, wet the surface of the solid metal which is to be brazed with the brazing metal. The presence of metal oxides at the interface between the solid metal to be brazed and the molten brazing metal prevents the desired wetting action. When the brazing operation is carried out in a reducing atmosphere, various of the oxides which would normally form at the elevated temperatures involved are prevented from forming and any which do form, other than those of particularly stable character, are promptly reduced. Hence, as is well known, dry reducing or inert atmospheres tend to maintain the conditions conducive to wetting and generally bring about desirable brazing results.

In many brazing operations, however, the procedure including the heating step, from a practical standpoint, must be carried out in air or in the open atmosphere and, hence, it is common practice to utilize fluxes to remove the metal oxides which inevitably form, the fluxes functioning essentially as oxide removers and oxygen barriers. Conventional brazing fluxes comprise mixtures of salts which are solid at normal temperatures and which must be melted in contact with the work or solid metal to be brazed before they are effective to bring about their intended removal of metal oxides. In other words, for best results, the flux used must be molten and active before the brazing metal bonds to the work. A satisfactory flux must also be of such character as to form a continuous, unbroken film over the joint area; even when loaded with dissolved and suspended oxides it must have a viscosity sufficiently low to assure its physical displacement by the molten brazing metal from the narrow capillary gaps of the joint; it should be easily removable from the brazed work and, if not completely removed or removable, the residue should not be of such character as to cause eventual corrosion as, for instance, by hydrolysis. It is also known that the lower the temperature at which the brazing operation can be conducted the less will be the amount of oxidation of the work before said brazing operation is completed. Since flux mixtures of very low melting point are relatively unstable at higher temperatures, some compromise is necessary. For practical purposes, a flux should be molten and active at a temperature about 90 degrees F. below the temperature at which the brazing metal starts to melt and, in addition, the flux should be stable up to the maximum temperature required during the brazing operation. So far as I am aware, none of the brazing fluxes which are in use or which have been suggested for use fully satisfies the aforementioned requirements.

In an effort to meet the problems in brazing and to eliminate the necessity for the use of either reducing atmospheres or the use of fluxes, the employment of certain self-fluxing brazing alloys has been proposed, such alloys containing constituents capable of reducing the metal oxides normally formed in the brazing operation. In this conection, it has heretofore been known to produce self-fluxing silver base alloys containing a small percentage of lithium, generally about 1% to about 2%. Such self-fluxing alloys can be used with reasonably good results if the brazing operation is carried out in an inert atmosphere as, for example, helium or nitrogen, or in an oxyacetylene torch brazing atmosphere, for the brazing of such metals as plain carbon steels, alloy steels, stainless steels, and various other metals; or, in the case of titanium, a helium atmosphere. Such silver-base self-fluxing brazing alloys possess the marked disadvantage, however, of requiring special atmospheres, such as dry inert atmospheres, in which the brazing operation is to be carried out. Even very small proportions of oxygen or moisture in the inert atmosphere cause oxidation of the lithium and the joints brazed by such alloys become contaminated by lithium oxide.

I have discovered that certain palladium-nickel-lithium-boron alloys, hereafter described in detail, have particularly desirable self-fluxing "air-proof" brazing properties. Such brazing alloys can be utilized with considerable effectiveness, without the necessity of using fluxes or carrying out the brazing operation in reducing atmospheres or inert atmospheres, for brazing various metals but are especially effective for brazing steels including plain carbon steels and alloy steels such as stainless steels. In a typical or illustrative instance, 303 stainless steel was brazed in air by the use of brazing alloys of my present invention. Extremely strong joints were obtained. Tensile strengths of joints brazed with the brazing alloys of my invention were of the order of 40,000 p.s.i. in typical instances. The brazing alloys of my invention, with the important advantages of enabling the brazing operation to be carried out in air and without extraneous fluxes, can also be used for brazing ceramics to metals because they have been found to wet porcelains. They also possess utility in the application of metallized coatings by spray techniques as well as in dip processes for the coating of various steels.

The boron content of the brazing alloys of my invention will, in general, range from about 0.25% to about 2.5%, preferably about 0.5% to about 1.5%, and especially about 0.7% to about 1.2%.

The lithium content of the brazing alloys of my invention will, in general, range from about 0.25% to about 8%, preferably about 0.5% to about 4%, and especially about 1% to about 2%.

The nickel content of the brazing alloys of my invention will, in general, range from about 5% to about 50%, preferably about 10% to about 30%, and especially about 15% to about 25%.

The palladium content of the brazing alloys of my invention will, in general, range from about 40% to about 95%, preferably about 50% to about 80%, and especially about 60% to about 70%.

In general, the nickel content of the brazing alloys of the present invention should be of the order of several times the amount of the boron, advantageously from 15 to 20 or more times that of the boron, in the particularly preferred embodiments of my invention.

It will be understood, of course, that minor proportions of other elements may be present or added so long as they do not unduly adversely affect the desirable self-fluxing or air-proofing brazing properties of the alloys.

The following examples are illustrative of typical self-fluxing, "air-proof" brazing alloys falling within the scope of my invention. It will be understood that others may readily be prepared in the light of the guiding principles and disclosures provided herein.

|  | Percent Pd | Percent Ni | Percent B | Percent Li |
|---|---|---|---|---|
| Example 1 | 78 | 19.25 | 0.75 | 2 |
| Example 2 | 64 | 33.3 | 1.2 | 1.5 |
| Example 3 | 75 | 23 | 0.5 | 1.5 |
| Example 4 | 66.5 | 28.8 | 1.2 | 3.5 |
| Example 5 | 55 | 40 | 2 | 3 |
| Example 6 | 74 | 23 | 1 | 2 |
| Example 7 | 87 | 9.7 | 0.3 | 3 |
| Example 8 | 40 | 57.4 | 0.6 | 2 |
| Example 9 | 50 | 46 | 1 | 3 |
| Example 10 | 87 | 10 | 1 | 2 |

A suitable method for the preparation of the brazing alloys of my invention comprises initially preparing an alloy of the palladium with the lithium and then alloying the same with a previously prepared nickel-boron-alloy. By way of illustration, in the case of one embodiment of my invention, 19 parts of palladium and 1 part of lithium are alloyed by melting the same together in a recrystallized alumina crucible in an atmosphere of 90% nitrogen-10% hydrogen. The resulting alloy is then melted together with 6 parts of a eutectic nickel-boron alloy (96 Ni—4% B) in an alundum crucible in a 90% nitrogen-10% hydrogen atmosphere. The nominal composition of the resulting alloy is 66.5% Pd, 28.8% Ni, 3.5% Li and 1.2% B. The melting point of the alloy is approximately 2000 degrees F. It should be observed that, in melting and remelting of the alloys to obtain desired homogeneity in the alloys, a loss of lithium occurs and this should be taken into account in determining the amount of lithium deisred in the final alloys. The brazing alloys of my invention can be rolled to strip form or converted to a form satisfactory for use in brazing operations.

As has been described above, the brazing operation, utilizing the brazing alloys of my invention, can be carried out in air and without the use of extraneous fluxes. This represents the partciularly preferred aspect of my invention. One can, of course, conduct the brazing operation in appropriate inert atmospheres or reducing atmospheres as well as with extraneous special types of fluxes such as dry lithium chloride, although, in such cases, the full advantages of the invention are not achieved. Oxy-acetylene torch brazing techniques are quite satisfactory.

What I claim as new and desire to protect by Letters Patent of the United States is:

1. A new and improved self-fluxing, air-proof brazing alloy containing from about 0.25% to about 8% lithium, from about 0.25% to about 2.5% boron, from about 5% to about 50% nickel, and the balance consisting essentially of palladium.

2. A new and improved self-fluxing, air-proof brazing alloy containing from about 0.5% to about 4% lithium, from about 0.5% to about 1.5% boron, from about 10% to about 30% nickel, and the balance consisting essentially of palladium.

3. A new and improved self-fluxing, air-proof brazing alloy containing from about 1% to 2% lithium, from about 0.7% to 1.2% boron, from about 15% to about 25% nickel, and the balance consisting essentially of palladium.

References Cited in the file of this patent
UNITED STATES PATENTS
2,714,760    Boam et al. _____ Aug. 9, 1955
FOREIGN PATENTS
373,725    Germany _____ Apr. 14, 1923
OTHER REFERENCES Lithium—Theoretical Studies and Practical Applications (Osborg), published by The Electrochemical Society (New York city) 1935; pages 29, 31, 32, 46 and 48 are relied on.